United States Patent Office 3,702,843
Patented Nov. 14, 1972

3,702,843
NITRITE, NITRATE AND SULFATE ESTERS OF POLYHYDROXY POLYMERS
Richard G. Schweiger, 114 Lord Ave., Muscatine, Iowa 52761
No Drawing. Filed May 25, 1970, Ser. No. 40,442
Int. Cl. C08f 27/12
U.S. Cl. 260—91.3 VA    5 Claims

ABSTRACT OF THE DISCLOSURE

The novel polymer nitrite ester compounds and the process of preparing them by nitrosating a mixture containing a polyhydroxypolymer and a suitable solvent at a temperature of 0–50° C. Further, the novel process of preparing a water soluble polymer nitrate ester by heating the corresponding polymer nitrite ester in the presence of nitric acid to a temperature ranging from 60–110° C. for a period of one-quarter to two hours.

Also an integral part of this invention are novel polymer sulfate ester salts and the process of preparing them comprising the steps of (1) sulfating the corresponding polymer nitrite ester at a temperature ranging from about 0 to about 25° C. to obtain the corresponding polymer nitrite sulfuric acid ester, (2) reacting the reaction mixture of step 1 with a protic solvent to obtain the polymer sulfate ester, and (3) neutralizing or slightly alkalizing the polymer sulfate ester reaction mixture with an alkali to obtain the corresponding polymer sulfate ester salt. The polymer sulfate ester salts have valuable thickening properties useful to form viscous products.

FIELD OF THE INVENTION

This invention relates generally to esters of polyhydroxypolymers, and more particularly to the novel nitrite esters, lower nitrate esters and sulfate ester salts of the polymers having valuable properties respectively as intermediates and as thickening agents. Also an integral part of this invention are the processes of preparing these compounds with a selective degree of esterification and a minimum of depolymerization.

BACKGROUND OF THE INVENTION

Polyhydroxypolymers used in this invention are limited to the general class of compounds known as polysaccharides and polyvinyl alcohols. These compounds contain a number of polymer units with each unit containing 1 to 3 reacting hydroxyl groups.

Esters of these compounds have been prepared by a number of methods described in the literature, however, owing to the large molecule and the various degrees of substitution; hereinafter referred to as D.S., the resulting esters may have varying physical and chemical properties which may be disadvantageous for certain intended uses. For example, in preparing the nitrate esters of these compounds by prior methods, the resulting product usually results in a completely esterified compound characterized as being insoluble in water, though soluble in certain organic solvents. In the prior synthesis of the sulfate esters of these compounds, the reaction usually is so harsh that severe depolymerization of the molecule results, such that the resulting product is of little value. Also, in the case of cellulose, the common method is to sulfate the insoluble fiber thereof, which reaction proceeds by the "peeling-process," such that the resulting product is not homogeneous. It can thus be seen that the physical and chemical properties of the resulting products are dependent upon both the lack of depolymerization of the starting compound resulting from the reaction and the D.S. of the resulting product.

It has been learned that the nitrate and sulfate esters can be easily synthesized by using a corresponding polymer nitrite ester as the starting compound. The resulting products show relatively low depolymerization and a selective degree of esterification or substitution. The resulting products are further distinguished by their homogeneity with respect to the D.S., i.e. sulfate groups are homogeneously distributed over the macromolecule and therefore differ from conventional products not only by their much greater viscosities but also in their other properties such as their compatibility with certain metal ions.

The novel polymer nitrate esters are prepared by nitrosating a suspension of the desired polyhydroxypolymer starting material in a suitable organic solvent at a temperature below 50° C. The nitrosating compound is dinitrogentetroxide which is in equilibrium with its monomer nitrogendioxide. The compound has been previously reported as capable only of oxidizing polysaccharides at the C6 position of the molecule with simultaneous severe degradation. I have overcome this problem by using a suitable reaction medium for the polyhydroxypolymer and reacting the mixture at a relatively low temperature.

The soluble nitrate esters can be easily prepared from the corresponding nitrite esters by simply heating the solvated nitrite esters in the presence of nitric acid. The resulting product is soluble in water, is relatively undegraded, and its aqueous solutions tolerate relatively large amounts of water miscible organic solvents.

The polymer sulfate esters are prepared by sulfating the polymer nitrite ester with sulfurtrioxide or a complex thereof at a low temperature and removing residual nitrite groups with a protic solvent to prepare a relatively undegraded polymer sulfuric acid ester, which in turn is neutralized or made slightly alkaline to prepare the more stable salt thereof. The undegraded product is highly soluble and possesses a high viscosity making it useful as a thickening compound.

SUMMARY OF THE INVENTION

The process of preparing a polymer nitrite ester comprising the step of nitrosating a polyhydroxypolymer suspended in a suitable solvent capable of functioning as both a swelling or solubilizing agent and a proton acceptor with the compounds selected from the group consisting of dinitrogentetroxide and nitrosylchloride at a temperature below 50° C.

The process of preparing a polymer nitrate ester comprising the step of heating a polymer nitrite ester solution at a temperature ranging from 60 to 110° C. for one-quarter to two hours to obtain a polymer nitrate ester having a D.S. below 0.6. Alternatively, heating the solution in the presence of an excess of nitric acid or acetic anhydride under the same conditions to obtain a water soluble polymer nitrate ester having a D.S. to 1.0.

The process of preparing a salt of polymer sulfuric acid ester comprises the steps of:

(1) sulfating a polymer nitrite ester solution with sulfurtrioxide or a complex thereof at a temperature ranging from 0–25° C. to obtain a polymer nitrite sulfate ester;

(2) reacting the mixture of step 1 with a protic solvent to remove the residual nitrite groups and obtain polymer sulfate ester; and (3) neutralizing to slightly alkalizing the mixture of step 2 with a base to form the polymer sulfate ester salt.

The novel polymer nitrite esters and polymer sulfate ester salts are also an integral part of this invention. The former compounds have specific utility as intermediates in the synthesis of water soluble and undegraded polymer nitrate esters and alkali polymer sulfate esters. The latter compounds have utility as thickening agents.

DESCRIPTION OF THE PRODUCTS AND PROCESS

The initial starting compound of this process can be any known polyhydroxypolymer. Typical examples of such compounds are the polysaccharides: cellulose, starch, hemicellulose, guar and locust bean gums, gum arabic and mannans; the polyuronic acids typified by alginic and pectic acids, and the synthetic polyvinyl alcohols. All of the foregoing compounds are readily known in the art and all are available commercially.

The starting polyhydroxypolymer is suspended in a suitable solvent including a swelling or solubilizing agent for the resulting polymeric nitrite esters and a proton acceptor. Solvents found suitable for serving both of these functions include weak tertiary amine bases typified by pyridine and quinoline and N,N-dialkyl acidamides such as N,N-dimethylformamide and N,N-dimethylacetamide, hereinafter referred to as DMF and DMAC respectively, and mixtures thereof. Typical examples of swelling or solubilizing agents are ethyl acetate, ethyl formate, benzene, acetone, methylethyl ketone and mixtures thereof. Compounds suitable as proton acceptors are those previously described as capable of providing both functions.

The amount of solvent used to suspend the polyhydroxypolymer is not critical and may vary within a wide range, however enough solvent should be used to avoid difficulty in handling the resulting viscous mixture. Generally it has been found that a minimum amount of solvent to polymer ratio by weight is 3:1 respectively.

While a mixture of proton acceptor-swelling agent solvent is possible, it is preferred that a single solvent capable of performing both functions be used to facilitate recovery and reuse thereof. However, should a mixture be desired, it is necessary that the mixture contain at least 1 mole of proton acceptor to 1 mole of nitrosating compound, as hereinafter described.

The first step of this process comprises nitrosating a polyhydroxypolymer suspended in a suitable solvent with a compound selected from the group consisting of dinitrogentetroxide, nitrosylchloride and mixtures thereof to obtain the corresponding polyhydroxypolymer nitrite ester.

The nitrosating compound is used in the reaction mixture in a molar ratio of anhydroglycose or generally polymer unit to dinitrogentetroxide or nitrosylchloride of about 1:1, 2 or 3, resulting in D.S. of 1, 2 or 3 respectively. Since the reaction is quantitative, the D.S. approximately coincides with the molar amount of nitrosating agent used. If nitrosylchloride is used in combination with DMF or DMAC, a 2.5 to 3.0 fold excess of the reagent is required to attain these D.S.'s. Stated another way, one mole of dinitrogentetroxide or nitrosylchloride is necessary to replace one mole of hydroxyl radical of the polyhydroxypolymer, and if nitrosylchloride is used with an N,N-dialkylacidamide as the proton aceptor, 2.5–3.0 moles of nitrosylchloride are required.

To clarify, the maximum D.S. for hexosans, such as cellulose, starch, guar and locust bean gums, mannans, and the like, is about three; or pentosans such as hemicellulose and polyuronic acids, such as alginic and pectic acids is about two; and for polyvinyl alcohols the maximum D.S. is about one or less. Thus, the molar amount of dinitrogentetroxide necessary to obtain complete esterification for hexosans is about three moles per mole of anhydrohexose unit, for pentosans and polyuronic acids about two moles per mole of anhydropentose or uronic acid units, and for polyvinyl alcohols about one mole or less depending upon the degree of saponification of the starting compound. The same mole ratio amount of nitrosylchloride is necessary for complete esterification of each of the hereinbefore described classes of polyhydroxypolymer unless DMF or DMAC is used as the solvent, in which case the amount was to be substantially tripled. An excess amount of the nitrosating compound beyond that necessary for complete esterification may be added with the only effect being an increased rate of esterification.

The reaction is preferably carried out with constant agitation of the reaction mixture. It is necessary that the nitrosating compound be introduced into the polymer suspension under the exclusion of moisture. It is preferable to cool the reaction vessel in an ice bath, or the like, since the reaction is moderately exothermic and it is necessary to stabilize the temperature of the reaction mixture below 50° C. and preferably below 30° C.

If maximum esterification is desired, completeness of the reaction is indicated by the formation of a clear solution or paste, while partial esterification is indicated by a swelling and/or partial dissolving of the product in the reaction mixture.

The polymer nitrite esters are relatively sensitive products and decompose immediately upon addition of a protic solvent, such as water, methanol, ethanol, isopropanol, or the like in the presence of a mineral acid catalyst to regenerate the undegraded starting polyhydroxypolymer. The regenerated compound is recoverable by filtration.

Since the novel polymer nitrite esters of this process find their primary utility as intermediates for the production of polymer nitrate and sulfate esters, there is no need to isolate them as the reaction mixture may be used for those processes, as hereinafter described. However, the polymer nitrite esters may be isolated by neutralizing the reaction mixture by the addition of a base, such as mono-, di-, and trialkylamines, pyridine, alkali or alkali earth metal hydroxides, carbonate, bicarbonate, or the like. The addition of such a base is necessary only if an N,N-dialkylacidamide had been used as the proton acceptor since, during nitrosation with dinitrogentetroxide or nitrosylchloride, an equimolar amount of nitric acid or hydrochloric acid is formed. If a weak tertiary amine base, such as pyridine or quinoline, had been used as the proton acceptor, the addition of a base is unnecessary since, then, the acid formed is neutralized by the tertiary amine base and cannot serve as a catalyst for the decomposition of the polymer nitrite.

The neutralized, or preferably slightly alkaline solution is then added to ice cold water with stirring to separate the polymer nitrite ester as a fibrous material, which may be easily removed. Those products with a D.S. considerably below the maximum may be swellable or even soluble in water, in which case an alcohol is used in place of the water.

The isolated product is relatively unstable and for storage purposes it is preferred that it be solvated in a suitable solvent such as benzene, ethylacetate, ethylendichloride, DMF, DMAC, or the like and stored at a low temperature, preferably below 10° C.

The second step of this process comprises heating the polymer nitrite ester solution with agitation at a temperature of 60–110° C. for a period of 15 minutes to about two hours to obtain the corresponding polymer nitrate ester.

Although the polymer nitrate ester solution of this step is generally the reaction mixture of step 1, in which DMF or DMAC has been used as the proton acceptor and dinitrogentetroxide as the reagent and in an amount sufficient for nitrosation to about the maximum D.S., the polymer nitrite ester may be isolated first then redissolved in one of the solvents as stated above and the corresponding amount of anhydrous nitric acid added. The use of the reaction mixture of step 1 for this step obviates the step of isolation of the polymer nitrite ester as hereinbefore described.

It is preferred that the temperature of the heating step range from about 80 to about 100° C. and the time of the heating step be from about one to two hours to assure a maximum D.S. The D.S. of the resulting polymer nitrate esters depends upon the reaction temperature and on the reaction time. Generally, the higher the temperature and the longer the time, the higher will be the D.S. Thus, the D.S. of the resulting polymer nitrate esters will range from slightly above 0 to about 0.6.

The D.S. of the resulting polymer nitrate ester may be increased to about 1.0 by the addition of an excess of anhydrous nitric acid and/or acetic anhydride to the reaction mixture prior to heating. It is preferred that the anhydrous nitric acid or acetic anhydride be added to the mixture in a range of about 1 to 10 moles per mole of polymer unit.

Subsequent to heating, the polymer nitrate ester is isolated by pouring the reaction mixture slowly and with agitation into two to five volumes of a water micsible protic solvent, such as methanol, ethanol, isopropanol, and the like, which splits off residual nitrite groups and separates the resulting product. This product is then filtered off, washed with fresh solvent and dried.

The resulting product is water soluble, and aqueous solutions tolerate relatively high concentrations of water miscible organic solvent such as the alcohols and ketones. Cellulose nitrate becomes water soluble if the D.S. exceeds about 0.5. To illustrate, if the D.S. of the cellulose nitrate ester is lower than about 0.5, the product can be highly hydrated but does not completely dissolve. Further, the solutions of the polymer nitrate esters have a relatively high viscosity and owing to their solubility or improved hydration in water and aqueous organic solvent, their usefulness is enhanced.

To form the polymer sulfate ester step 2 is omitted and alternately, the next step of the process comprises sulfating the polymer nitrite ester solution, preferably with a sulfurtrioxide-solvent complex, at a low temperature to obtain polymer nitrite sulfuric acid ester.

The polymer nitrite ester solution preferably comprises the reaction mixture of step 1, in which an N,N-dialkylacidamide has been used as the proton acceptor. The temperature of the reaction mixture must be maintained in the range from about 0° C.–25° C., and preferably 5–15° C. to prevent depolymerization of the molecule.

The preferred sulfating agent is sulfurtrioxide which may be added to the reaction mixture in either its liquid or gaseous form or as a solution in an inert solvent such as carbontetrachloride. However, since the addition of sulfurtrioxide is very exothermic, and the low temperature is critical to the viscosity of the desired product, it must be added slowly with stirring, while maintaining the reaction mixture in a cooling medium such as an ice bath.

In practice, it is preferred that the sulfating agent be first added to a solvent, preferably the same solvent as contained in the reaction mixture to facilitate solvent recovery, to form a complex which upon addition to the reaction mixture forms a less heat producing reaction. Examples of solvents capable of forming a complex with sulfurtrioxide are DMF, DMAC dioxane and pyridine. Generally, the mole ratio of the sulfurtrioxide to the solvent in the complex is 1:1.

The complex is slowly added to the reaction mixture with agitation and exclusion of moisture. The amount of sulfating agent to be added to the mixture is dependent upon the D.S. desired of the resulting product. A low D.S. value ranging between 0.1 to 1.0 requires about 0.1 to about 1.1 mole of sulfurtrioxide per mole of anhydroglucose unit. A D.S. value ranging from about 1.0 to about 2.0 is less quantitative and requires about 1.0 to 4.0 mole of sulfurtrioxide per anhydroglucose unit. A D.S. exceeding 2.0 is difficult under the reaction conditions, and a large excess of sulfurtrioxide is required.

The addition of the sulfating agent to the polymer nitrite ester mixture forms a mixed polymer nitrite sulfuric acid ester. Although the polymer nitrite ester with a maximum D.S. may be used for the sulfation, it is preferred to use the lower D.S. polymer nitrites particularly where a D.S. of above about 1.1 is desired. Generally, the higher the degree of sulfation desired, the lower may be the degree of nitrostation such that the mixed polymer nitrite sulfuric acid ester has a maximum D.S. In other words, the sum of the degree of nitrostation and the degree of sulfation should be about 3 for the hexosans, about 2 for pentosans and polyuronic acids, and about 1 or less for the polyvinyl alcohols.

The next step of the process comprises reacting the mixed polymer nitrite sulfuric acid ester mixture with a protic solvent to obtain the corresponding polymer sulfuric acid ester.

The addition of a protic solvent such as water, methanol and ethanol results in the production of the pure polymer sulfuric acid ester. The protic solvent replaces the nitrite groups of the product with hydroxyl groups and is added in stoichiometric amounts or an excess thereof.

To isolate the polymer sulfate ester product, two to four volumes of a water miscible solvent, i.e. acetone, is added to the mixture to separate the sulfated polymer therefrom. The ester is filtered and washed with fresh solvent, and redissolved in ice water.

The next step of the process comprises neutralizing the polymer sulfuric acid ester with a base to form the salt thereof.

The isolated polymer sulfuric acid ester upon storage will degrade and therefore it is preferable to convert it to the neutral salt. The preferred bases for neutralizing the sulfate ester are the hydroxides, carbonates and bicarbonates of the alkali and alkali earth metals, while ammonium hydroxide and the amines are likewise useable for this purpose.

Instead of neutralizing an aqueous solution of the isolated polymer sulfuric acid ester, the polymer sulfuric acid ester-protic solvent reaction mixture of the previous step may be neutralized directly to obtain the polymer sulfate ester salt.

The resulting salt product is isolated by adding the neutralized mixture to a water miscible solvent such as acetone, methanol, ethanol, and isopropanol. The isolated product is soft and if additional hardening of the material is desired, fresh solvent may be added thereto. The separated polymer sulfate ester salt is then removed and dried for storage.

The product is water soluble and since it does not undergo depolymerization, a 1% aqueous solution produces a very viscous and stable solution. The sodium cellulose sulfate esters become water soluble if the D.S. exceeds about 0.3 and have viscosity measurement of as high as 8000–9000 cps.

As a result of this unique physical property, the products exhibit utility as thickening, suspending and emulsifying agents. Generally, the viscosity decreases somewhat as the D.S. increases simply because of the additional weight to the polymer. However, in the application in bone glue it is preferred to use a product having a D.S. of above 1.0 since in this particular use, best results are obtained with the higher D.S. products.

The following examples illustrates specific preferred embodiments of this invention and are not intended to be limting. All ratios in the following examples as well as in the specification and in the appended claims are by weight unless otherwise indicated. Temperatures are expressed in degrees centigrade.

EXAMPLE I (A) Preparation of cellulose nitrite ester from cellulose 20 g. of Whatman cellulose powder, CF. II, was dried overnight at 110° C. and placed in a three-neck, round bottom flask equipped with a mechanical stirrer and calcium chloride tube. 200 ml. of N,N-dimethylformamide (DMF) was added to the cellulose powder and the mixture was stirred at room temperature. With exclusion of moisture, dinitrogentetroxide ($N_2O_4$) gas was slowly introduced to the mixture over a period of two hours. It was observed that the mixture thickened with about 7–8 g. of $N_2O_4$ and that a transparent viscous mixture without any essential development of color was obtained upon introducing approximately 15 g. of $N_2O_4$. After introduction of approximately 30 g. of $N_2O_4$, the mixture formed a bluish green viscous solution, and on further addition of $N_2O_4$, the color became a deep green while the viscosity appeared to remain constant.

To a sample of the three solutions, an excess of pyridine was added and the slightly alkaline mixture was poured with stirring into ice water. A fibrous precipitate was formed, removed, washed with ice water and pressed out, and the temperature was maintained at 0–5° C. The fibrous precipitate of the first two samples was found to be swellable and that of the third sample was found to be soluble in common solvents for polymer esters including dimethylformamide, dimethylacetamide, benzene, acetone and ethylacetate. Upon attempting to dry the fibrous precipitate, the product decomposed as indicated by the release of brown fumes. The resulting dried product was found insoluble in the above described common polymer ester solvents.

To identify the resultant products as cellulose nitrite esters and the degree of substitution or esterification (D.S.) thereof, the products were decomposed and cellulose and nitrous acid determinations were made. Products isolated from the above three solutions were washed with ice water and suspended in distilled water in a closed Erlenmeyer flask, acidified with sulfuric acid, and magnetically stirred at room temperature for 1 hr. The mixture was then neutralized with sodium hydroxide and the insoluble cellulose was regenerated, filtered off, washed with distilled water and dried in vacuo at 100° C. The filtrate was collected for testing, as hereinafter described.

The identity of the regenerated cellulose was determined by comparison of the regenerated cellulose with the starting material by IR spectrophotometry, negative nitrogen analysis and found identical by the Kjeldahl method, and the absence of carboxyl groups as determined by the method of Samuelson and Wennerblom described in "Methods in Carbohydrate Chemistry," vol. III Cellulose, 1963, p. 34.

To determine the lack of depolymerization of the molecule during the reaction and during storage of the reaction medium, the viscosity of the regenerated cellulose from reaction mixtures kept over various periods of time, in cuprammonium hydroxide solution was compared with the viscosity of the starting material in the same solution at an identical 0.5% concentration. The viscosities were measured with a Cannon Fenske Viscometer at 25° C. The results of the tests are tabulated in the table below:

| Material | Time and temperature of storage | Viscosity, sec. |
| --- | --- | --- |
| Starting cellulose control | | 28.8 |
| Regenerated cellulose | 6 hr., 5° C. | 27.0 |
| Do | 30 hr., 5° C. | 28.8 |
| Do | 120 hr., 5° C. | 28.3 |
| Do | 288 hr., 5° C. | 27.8 |

The nitrite in the filtrate, as hereinbefore described, was determined by oxidation with permanganate solution to nitric acid. The presence of nitric acid subsequent to oxidation was established by its determination as nitron nitrate according to the method of Hick described in Analyst, vol. 59, pp. 18–25 (1934).

The degrees of substitution were calculated from the weight of the cellulose and the amount of nitrous acid. The degrees of substitution calculated for the first solution containing about 7–8 g. of $N_2O_4$ was 0.7; the second solution containing about 15 g. of $N_2O_4$ was 1.5 and for the third solution containing about 30 g. of $N_2O_4$ was 2.8.

Results substantially similar to those obtained above are obtained when the following starting cellulose materials are substituted for Whatman cellulose powder: cotton linter pulp, celluloses derived from wood or isolated from rice, corn, barley and oat hulls or from bagasse. However, if the foregoing starting materials are used, the amount of DMF used must be increasd owing to the higher viscosities of the resulting products. Likewise, results similar to those obtained above are obtained when the following solvents are substituted for N,N-dimethylformamide: N,N-dimethylacetamide, pyridine, quinoline, and mixtures thereof, or mixtures of one or more of the foregoing solvents and benzene, ethylacetate, or acetone. It was also found that the dinitrogentetroxide gas could be replaced by its liquid form or a solution thereof in one of the above solvents and by nitrosylchloride to produce substantially similar results.

(B) Preparation of cellulose nitrate from cellulose nitrite ester

A dry 500 ml. three-neck, round bottom flask was charged with 9 g. of Whatman cellulose powder, CF II, suspended in 300 ml. of DMF and solubilized by adding approximately 15 g. of dinitrogentetroxide gas to form cellulose nitrite ester solution. The cellulose nitrite ester solution was mechanically stirred and heated at 90° C. for 50 minutes, poured slowly and with agitation into about 6 volumes of methanol to form a precipitate, which was filtered, washed with methanol, and dried.

Upon analysis the precipitate was found soluble in water and upon IR analysis showed a strong absorption peak at about 1680 cm.$^{-1}$, each test indicative of nitrate ester groups.

Nitrogen determinations by the Kjeldahl method indicated the presence of nitrogen from which a 0.5 degree of substitution was calculated.

The addition of 15 g. of anhydrous nitric acid or 24 ml. of acetic anhydride to the cellulose nitrite ester solution prior to heating revealed that the degree of substitution for the resulting cellulose nitrate ester was elevated to 0.8.

Results substantially similar to those obtained above are obtained when DMF is a substituted by DMAC or by a mixture of DMF or DMAC and benezene.

EXAMPLE II (A) Preparation of hemicellulose nitrite ester from hemicellulose

A 500 ml. three neck round bottom flask equipped with a mechanical stirrer and calcium chloride tube was charged with 40 g. of hemicellulose extracted from corn hulls and suspended in 300 ml. of DMF. The suspension was mechanically stirred and under the exclusion of moisture, 58 g. of dinitrogentetroxide gas was slowly introduced to the mixture at room temperature to form a clear viscous solution of hemicellulose nitrite ester.

To a portion of the solution was added an excess of pyridine and the slightly alkaline solution was slowly poured with stirring into ice water to separate a fibrous precipitate. The precipitate was removed, washed with ice water and pressed out. The resulting precipitate was found soluble in the common polymer ester solvents described in Example 1–A. Upon drying, the precipitate decomposed releasing brown fumes.

Hemicellulose was regenerated for analysis by slowly adding a portion of the remaining hemicellulose nitrite ester solution to four volumes of methanol with agitation forming a precipitate which was filtered, washed with methanol, and dried. The precipitate was identified as hemicellulose by IR spectrophotometry and by negative nitrogen analysis by the Kjeldhal method.

The lack of depolymerization of the regenerated hemicellulose was determined by preparing 2% aqueous solutions of the regenerated product and the starting material and adjusting the pH of the solutions to 6.7 with a dilute sodium hydroxide solution. The viscosities of the two solutions were measured with a Cannon Fenske Viscometer at 25° C. The viscosity of the regenerated hemicellulose was observed to be 138.5 sec. and the starting material 146.2 sec.

To identify the product as the nitrite ester and to determine the D.S., an excess of triethylamine was added to the reaction mixture and the slightly alkaline solution was poured slowly and with stirring into ice water which resulted in the separation of hemicellulose nitrite ester. The hemicellulose nitrite was removed, suspended in water, and the mixture acidified with sulfuric acid and stirred for about 1 hour. Then, it was neutralized with sodium hydroxide and the neutral solution was added to 4 volumes of methanol, wherein hemicellulose separated and was removed, washed with methanol, dried and weighed.

The filtrate was collected, the methanol removed by concentration in vacuo, and the resulting aqueous nitrite solution was oxidized with a permanganate solution to form nitric acid, the presence of which was established by its determination as nitron nitrate according to the method of Hick described in Analyst, supra.

The degree of substitution was calculated by the weight of the hemicellulose and the amount of nitrous acid, and was found to be about 2.0. With less $N_2O_4$, the D.S. was correspondingly lower.

Results substantially similar to those obtained above are obtained when the following reagents are substituted for N,N-dimethylformamide: N,N-dimethylacetamide, pyridine, quinoline and mixtures thereof, and mixtures of one or more of the above solvents and benzene, ethylacetate, or acetone. Likewise, dinitrogentetroxide liquid or nitrosylchloride can be substituted for the dinitrogentetroxide gas to produce substantially similar results.

Hemicellulose nitrate ester is prepared from the hemicellulose nitrite ester in the same manner as related in Section B of Example I.

EXAMPLE III (A) Preparation of starch nitrite ester from pregelatinized starch

A 500 ml. three neck round bottom flask equipped with a mechanical stirrer and calcium chloride tube was charged with 40 g. of pregelatinized starch and suspended in 300 ml. of DMF. Under exclusion of moisture, approximately 64 g. of dinitrogentetroxide gas was slowly introduced to the mixture at room temperature and the mixture was mechanically stirred to form a clear viscous solution of starch nitrite ester.

To test the resulting solution, an excess of pyridine was added to a portion of the solution and the slightly alkaline mixture was slowly poured with stirring into ice water to separate a fibrous precipitate. The precipitate was removed, washed with ice water and pressed out. The resulting precipitate was found soluble in the common polymer ester solvents described in Example I-A. Upon drying, the precipitate decomposed releasing brown fumes, indicative of a nitrite. The dried precipitate was again tested for its solubility, and found to be insoluble in the common polymer ester solvents.

Another portion of the starch nitrite ester solution was slowly added to four volumes of methanol with agitation, and the precipitate formed was filtered off, washed with methanol and dried. The precipitate was identified as starch by IR spectrophotometry and by negative nitrogen analysis by the Kjeldahl method.

The lack of depolymerization of the regenerated starch was determined by preparing a 1% aqueous solution of the regenerated product and comparing its viscosity against the starting material. The solutions were adjusted to a pH of 6.0 with a dilute sodium hydroxide solution and the viscosities of the two solutions were measured with a Cannon Fenske Viscometer at 25° C. The viscosity of the regenerated starch was observed to be 29.3 sec. as compared to 30.4 sec. for the starting material.

The product was identified as starch nitrite ester and its D.S. determined by the method described under Example II for hemicellulose. The degree of substitution was calculated by the weight of starch and the amount of nitrous acid, and found to be about 2.8. The D.S. was lower if a lower amount of dinitrogentetroxide was used for nitrosation.

Results substantially similar to those obtained above are obtained when the following starting materials are substituted for the gelatinized starch: alginic acid, guar gum and locust bean gum. Likewise, N,N-dimethylacetamide, pyridine, quinoline and mixtures thereof, and mixtures of one or more of the above solvents and benzene, ethylacetate, or acetone may be substituted for N,N-dimethylformamide to obtain substantially the same results. Further, nitrosylchloride, liquid dinitrogentetroxide, or a solution of dinitrogentetroxide in one of the above solvents could be substituted for the dinitrogentetroxide gas and produce substantially similar results.

The starch and other polysaccharide ester solution was converted to the corresponding nitrate ester solution in a manner similar to Example I-B.

EXAMPLE IV (A) Preparation of polyvinyl nitrite ester from polyvinyl alcohol

To a dry 500 ml. three neck round bottom flask, 10 g. of finely ground polyvinyl alcohol having a degree of saponification greater than 90% was suspended in 100 ml. of N,N-dimethylformamide. The mixture was mechanically stirred and under exclusion of moisture, dinitrogentetroxide gas was introduced. The vessel was cooled with cold water to keep the temperature at approximately 25° C. A clear viscous solution was obtained upon the addition of approximately 20 g. of dinitrogentetroxide gas.

Upon analysis, according to the methods described in Examples II and III, the resulting product was identified as polyvinyl nitrite ester having a degree of substitution of 0.8.

It was found that when the polyvinyl alcohol starting material had a degree of saponification less than 90%, substantially the same results could be produced as obtained above, however the amount of dinitrogentetroxide gas required to solubilize the starting material was less.

The nitrite ester was converted to the nitrate ester in a manner similar to Example I-B.

EXAMPLE V

Preparation of sodium alginic acid nitrate ester 2 g. of alginic acid was suspended in 80 ml. of DMF and solubilized by 4.5 g. of dinitrogentetroxide gas according to the procedure of Example III. The solution was heated at 90° for 40 minutes and added slowly, with agitation, to 3 volumes of ethanol to precipitate alginic acid nitrate ester. The isolated precipitate was resuspended in water and neutralized with sodium hydroxide. The neutralized solution was then added slowly to 3 volumes of ethanol to precipitate sodium alginate nitrate ester.

Results substantially similar to those obtained above are obtained when pectic acid is substituted for alginic acid. The substitution of potassium hydroxide, calcium hydroxide, magnesium hydroxide and ammonium hydroxide for the sodium hydroxide results in the corresponding potassium, calcium, magnesium and ammonium salts of the polyuronic nitrate esters.

EXAMPLE VI (A) Preparation of cellulose sulfuric acid ester 10 g. of cotton linter pulp having a high degree of polymerization was suspended in 500 ml. of DMF and reacted with dinitrogentetroxide to form the nitrite ester thereof with the maximum D.S. in accordance with Example I-A. 40 ml. of DMF containing 3.5 g. of sulfurtrioxide was added to the nitrite ester mixture dropwise over a period of about 40 minutes maintaining the temperature of the solution at 15° C., with vigorous agitation to form a clear viscous solution. 20 ml. of water was added to the viscous solution and it was then poured slowly and with vigorous agitation into 3 volumes of acetone to precipitate cellulose sulfuric acid ester, which precipitate was kneaded, washed with acetone, and redissolved in ice water.

(B) Preparation of sodium cellulose sulfate ester

The solution prepared in accordance with Example VI A was neutralized by the addition of sodium hydroxide to a pH of about 8.0 to form a clear viscous solution of sodium cellulose sulfate ester. The clear solution was added slowly and with agitation to 3 volumes of acetone to precipitate and isolate the product. The precipitated product was kneaded, collected, washed with fresh acetone and dried. Upon analysis, the yield of sodium cellulose sulfate ester was 13.9 g. having a degree of substitution of 0.65, and a viscosity of 6500 cps. as a 1% aqueous solution.

The viscosity was measured with a Brookfield Viscometer, Model LVT, at 12 r.p.m. and 25° C. To determine the degree of substitution, a 0.4 g. aliquot of the product was dissolved in 20% aqueous hydrochloric acid and heated for 15 hours at 100° C. A dark brown solution was formed and filtered. To the filtrate, an excess of barium acetate was added to precipitate sulfuric acid as barium sulfate. The barium sulfate was dried and weighed and the degree of substitution calculated therefrom.

Results substantially similar to those obtained above are obtained when the cotton linter pulp starting material is replaced by cellulose from other sources and/or having a lower edrgee of polymerization, hemicellulose, starch, alginic acid, guar gum, locust bean gum and polyvinyl alcohol. Other solvents capable of forming a complex with sulfurtrioxide and which may be substituted for DMF in the DMF-sulfurtrioxide complex are N,N-dimethylacetamide, pyridine, trialkylamine, dimethylsulfoxide and dioxane. Likewise, the sulfurtrioxide may be added to the solution alone in the form of a liquid or a gas, or diluted with an inert solvent such as carbontetrachloride though the reaction is highly exothermic and the use of an ice bath is necessary.

When the above procedure was repeated and the amount of sulfurtrioxide was reduced to 2.5 g., the resulting product had a degree of substitution of about 0.5 and a viscosity of about 6000 cps. The yield was reduced only slightly to 13.4 g.

An increase of the sulfurtrioxide to about 4–5 g. and about 6–7 g. resulted in D.S.'s of about 0.7–0.9 and about 1.0–1.1 with viscosities of about 6000–8000 cps. and about 3000–4000 cps. respectively.

Similar results were obtained when cellulose nitrite ester with a D.S. of 2.4–2.5 was used.

D.S. values of 1.2–1.3 and about 1.5–1.6 were obtained by using a cellulose nitrite ester having a D.S. of about 1.7–2.0 and about 1.4–1.6 and increasing the amount of sulfurtrioxide to about 8–10 g. and 12.14 g., respectively. The viscosities of 1% aqueous solutions of the products were about 1500–2000 cps. and about 800–1500 cps. respectively.

When cotton linter cellulose with a lower edgree of polymerization was used, the D.S.'s were similar but the viscosities were correspondinly lower. Similarly, cellulose from other sources generally produced products with lower viscosities.

EXAMPLE VII (A) Thickened rubbing alcohol composition

A thickened rubbing alcohol having the following composition is prepared:

| Component: | Percent by weight |
|---|---|
| Cellulose nitrate ester | 5.0 |
| Water | 25.0 |
| Ethyl alcohol | 70.0 |

The thickened rubbing alcohol exhibits a desired increased viscosity which tends to slow down evaporation of the alcoholic solution, prolong skin contact and thereby aid absorption.

EXAMPLE VIII (A) Non-running glue

| Component: | Amount by weight, g. |
|---|---|
| Bone glue | 150.0 |
| Sodium cellulose sulfate | 5 |
| Water | 1000 |

This improved glue exhibits a higher viscosity tending to retard running of the glue, particularly on vertical surfaces. The particular composition exhibited a viscosity of 1000 cps. at 25° C. and about 300 cps. at 50° C. and did not interfere or change the properties of the bonding glue.

I claim:

1. The process of preparing a polymer nitrite ester comprising nitrosating a polyhydroxypolymer selected from the group consisting of polysaccharides and polyvinyl alcohol suspended in a solvent consisting of a swelling or solubilizing agent and a proton acceptor selected from the group consisting of dimethylformamide, dimethylacetamide, pyridine, quinoline and mixtures thereof, and mixtures containing dimethylformamide, dimethylacetamide, pyridine or quinoline and ethylacetate, ethyl formate, benzene, acetone or methylethyl ketone with a compound selected from the group consisting of dinitrogentetroxide, nitrosylchloride and mixtures thereof at a temperature ranging from about 0 to about 50° C. under essentially anhydrous conditions.

2. The process of claim 1 wherein the polyhydroxypolymer is selected from the group consisting of cellulose, starch, guar gum, locust bean gum, hemicellulose, alginic acid, pectic acid and polyvinyl alcohol.

3. The process of preparing a polymer nitrate ester comprising nitrosating a polyhydroxypolymer selected from the group consisting of polysaccharides and polyvinyl alcohol suspended in a solvent consisting of a swelling or solubilizing agent and a proton acceptor selected from the group consisting of dimethylformamide, dimethylacetamide, pyridine, quinoline and mixtures thereof, and mixtures containing dimethylformamide, dimethylacetamide, pyridine or quinoline and ethylacetate, ethyl formate, benzene, acetone or methylethyl ketone with a compound selected from the group consisting of dinitrogentetroxide, nitrosylchloride and mixtures thereof at a temperature ranging from about 0 to about 50° C. under essentially anhydrous conditions followed by heating the resulting polymer nitrite ester solution in the presence of nitric acid at a temperature of about 60–110° C. for a period of one-quarter to two hours.

4. The process of preparing a polymer sulfuric acid ester salt comprising the steps of:

nitrosating a polyhydroxypolymer selected from the group consisting of polysaccharides and polyvinyl alcohol suspended in a solvent consisting of a swelling or solubilizing agent and a proton acceptor selected from the group consisting of dimethylformamide, dimethylacetamide, pyridine, quinoline and mixtures thereof, and mixtures containing dimethylformamide, dimethylacetamide, pyridine or quinoline and ethylacetate, ethyl formate, benzene, acetone or methylethyl ketone with a compound selected from the group consisting of dinitrogentetroxide, nitrosylchloride and mixtures thereof at a temperature ranging from about 0 to about 50° C. under essentially anhydrous conditions;

sulfating the resulting polymer nitrite ester with sulfurtrioxide or a complex thereof at a temperature ranging from about 0 to about 25° C. to obtain mixed polymer nitrite sulfuric acid ester;

reacting the mixed polymer nitrite sulfuric acid ester reaction mixture with a protic solvent to remove residual nitrite groups to obtain polymer sulfuric acid ester; and neutralizing to slightly alkalizing the polymer sulfuric acid ester with a base to obtain the polymer sulfuric acid ester salt.

5. The process of claim 4 wherein the base is selected from the group consisting of the hydroxides, carbonates and bicarbonates of sodium, potassium, calcium, magnesium, manganese and ammonium.

References Cited

UNITED STATES PATENTS

| | | | |
|---|---|---|---|
| 2,118,487 | 5/1938 | Burrows et al. | 260—144 |
| 2,623,037 | 12/1952 | Jones | 260—79.3 |
| 2,995,549 | 8/1961 | Zimmermann et al. | 260—233.5 |
| 3,236,669 | 2/1966 | Williams | 106—163 |
| 3,386,992 | 6/1968 | Schweiger | 260—234 |
| 3,477,802 | 11/1969 | Tesoro | 8—115.5 |
| 3,492,080 | 1/1970 | Tesoro | 8—115.7 |
| 3,527,810 | 9/1970 | Petit | 260—607 |

JAMES A. SEIDLECK, Primary Examiner

S. M. LEVIN, Assistant Examiner

U.S. Cl. X.R.

260—209.5, 209.6, 214, 215, 222, 233.5, 234 R, 235